United States Patent Office 3,285,905
Patented Nov. 15, 1966

3,285,905
1-{3-{[5,6,7,8-TETRAHYDRO - 4 - (ARYLAZO)-1-NAPHTHYL]A M I N O}PROPYL}PIPERIDINE COMPOUNDS
Edward F. Elslager and Leslie M. Werbel, Ann Arbor, Mich., assignors to Parke, Davis & Company, Detroit, Mich., a corporation of Michigan
No Drawing. Filed Aug. 30, 1963, Ser. No. 305,833
6 Claims. (Cl. 260—152)

The present invention relates to a novel class of azo compounds, to acid-addition salts thereof and to methods for their production. More particularly, it relates to novel 1-{3-{[5,6,7,8 - tetrahydro-4-(arylazo)-1-naphthyl] amino}propyl}piperidine compounds and non-toxic acid-addition salts thereof that possess anti-bacterial activity.

The novel 1-{3-{[5,6,7,8-tetrahydro-4 - (arylazo)-1-naphthyl]amino}propyl}piperidine compounds with which the present invention is concerned have in their free base form the structure

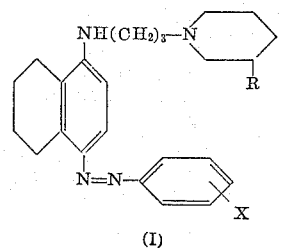

(I)

where R represents hydrogen or methyl and X represents a hydrogen or halogen atom; a lower alkyl, hydroxyalkyl, or alkoxy radical containing from one to three carbon atoms inclusive; or an acetyl, trifluoromethyl or nitro group.

The compounds of the invention can be prepared by the reaction of a 1-{3-[(5,6,7,8-tetrahydro-1-naphthyl) amino]propyl}piperidine compound having in free base form the formula

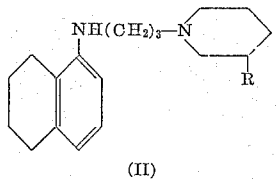

(II)

with a diazonium compound of the formula

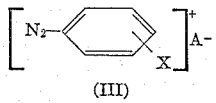

(III)

where A⁻ represents the anion of an acid or the OH⁻ ion and R and X have the same meaning as given above. Preferably, the reaction is conducted under acidic or neutral conditions (pH ≤7), although, if desired, basic conditions can be employed. In carrying out this condensation, it is generally satisfactory to employ substantially equivalent quantities of the reactants although a slight excess of either reactant is not harmful. Suitable solvents for the reaction are aqueous mixtures of water-miscible aliphatic alcohols, such as methanol, ethanol and propanol; tetrahydrofuran, N,N-dimethylacetamide, N,N-dimethylformamide, simple organic acids such as formic acid, acetic acid, propionic acid and the like. The acid furnishing the anion represented by A⁻ may also be used as solvent. Where it is desired to carry out the reaction at a controlled pH, a suitable buffer system may be employed. In general, the time and the temperature of the reaction are not critical; it is desirable, however, to avoid heating and a temperature below 15° C. is generally preferred.

The diazonium compounds of Formula III can be conveniently prepared in situ, by the reaction of an amine of the formula

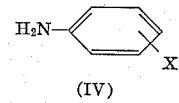

(IV)

with an alkali metal nitrite, such as sodium nitrite, in an acid medium (pH <7), or by other well-known methods; where X has the aforementioned significance. They can then be added directly to the reaction mixture containing the desired 5,6,7,8-tetrahydro-1-naphthylamine of Formula II.

The tetrahydronaphthylamines of Formula II, employed as starting materials in this reaction, can be prepared in various ways. For example, they can be prepared by reaction of 5,6,7,8-tetrahydro-1-naphthylamine or an alkali metal salt thereof with an amino-alkylating agent of the formula

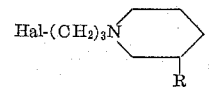

(V)

where Hal represents a halogen atom and R has the aforementioned significance. The reaction proceeds readily in a solvent medium. Suitable solvents for the reaction are benzene, toluene, xylene and the like. The preferred procedure involves the formation of the sodium salt of the tetrahydronaphthylamine prior to the addition of the aminoalkylhalide. Alternatively, the reaction can be conducted in the presence of a base such as an alkali-metal carbonate, for example, potassium carbonate. The reaction is usually carried out at the boiling point of the solvent used.

The tetrahydronaphthylamines of Formula II can also be prepared by reaction of a N-(3-halopropyl)-5,6,7,8-tetrahydro-1-naphthylamine of formula

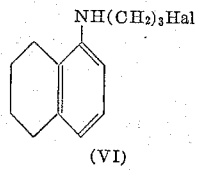

(VI)

with a piperidine compound of formula

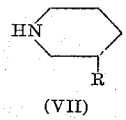

(VII)

where Hal represents a halogen atom and R has the aforementioned significance. The reaction is preferably carried out in a solvent medium such as ethanol, isopropanol, pentanol, glycols, acetone, dimethylformamide, dimethylacetamide or an excess of the piperidine compound employed in the reaction. The relative proportions of the reactants are not critical; best results, however, are obtained when an excess of the amine is employed. The reaction is favored by temperatures in excess of 50° C. and preferably is carried out between 50 and 150° C.

Another process for the preparation of the compounds of the invention comprises reacting an azo compound of the formula

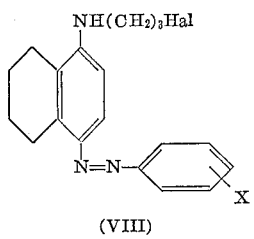

(VIII)

with a piperidine compound of Formula VII wherein Hal represents a halogen atom and X and R are defined as hereinbefore. The reaction is preferably carried out in a solvent medium. Some suitable solvents for this purpose are aliphatic alcohols, such as ethanol, isopropanol, pentanol, or glycols; dimethylformamide, dimethylacetamide, acetone or an excess of the piperidine compound employed in the reaction. The relative proportions of the reactants are not critical although best results are usually obtained when an excess of the piperidine compound of Formula VII is employed. The reaction is favored by temperatures in excess of 50° C. and is preferably carried out between 50° C. and 150° C.

The azo compounds of Formula VIII employed as starting materials in this reaction are conveniently prepared by the reaction of a compound of the formula VI with a diazonium compound of Formula III. Preferably, the reaction is conducted under acidic or neutral conditions (pH $\leqq 7$) in a suitable solvent medium. Substantially equivalent quantities of the reactants may be used. Where it is desired to carry out the reaction at a controlled pH, a suitable buffer system may be employed. In general, the time and temperature of the reaction are not critical; it is desirable, however, to avoid heating, and a temperature below 15° C. is preferred.

The compounds of the invention can be employed in the free base form or in the form of their non-toxic, acid-addition salts formed by the reaction of the free base with a variety of inorganic and organic acids. Some examples of the many organic and inorganic acids which can be used to produce non-toxic acid-addition salts are hydrochloric, hydrobromic, hydriodic, sulfuric, phosphoric, cholic, sulfamic, naphthalene-1,5-disulfonic, phenoxyacetic, lactic, tartaric, gluconic, alginic, citric, succinic, maleic, malonic, adipic mandelic, oleic, tannic, ethylsulfuric, penicillinic, benzoic, 5,5'-naphthalenedisalicylic, 3- and 5-phenylsalicylic, 3-hydroxy-2-naphthoic, 4,4' - methylenebis(3-hydroxy-2-naphthoic), 1,4,5,8-naphthalenetetracarboxylic, 4-biphenylcarboxylic, terephthalic, pyromellitic, 8-hydroxy-7-iodo-5-quinolinesulfonic, cyclopentylpropionic, cyclohexane carboxylic, arsanilic, and arsonic acid.

The compounds of the invention possess valuable antibacterial properties. More particularly, the compounds are effective against *Mycobacterium tuberculosis* infections in mammals. The resistance developed by some strains of tubercle bacilli against such drugs as streptomycin, sodium p-aminosalicylate and isoniazid represents a serious potential obstacle to the treatment of infections caused by these bacilli. One of the objects of the present invention is to provide compounds that are effective against both normal strains of tubercle bacilli and against strains that have developed a resistance to or lessened sensitivity to such prior-art drugs. The compounds of the invention also inhibit the growth of important fungi such as *Candida albicans, Cryptococcus neoformans, Histoplasma capsulatum, Nocardia asteroides* and *Trichophyton interdigitale*, and are useful as intermediates for the preparation of other chemical compounds that possess valuable antiparasitic and chemotherapeutic properties. For example the compounds can be reduced to provide 1-[3-(4-amino - 5,6,7,8 - tetrahydro - 1 - naphthylamino)propyl] piperidines.

The invention is illustrated by the following examples:

Example 1

A solution of 34.5 g. of sodium nitrite in 500 ml. of water is added at 0° C. with stirring to a solution of 46.6 g. of aniline in a mixture of 104 ml. of concentrated hydrochloric acid and 500 ml. of water. When the diazotization is complete, the diazonium salt solution is added at 0° to —5° C. with stirring to a solution of 136.2 g. of 1 - {3 - [(5,6,7,8, - tetrahydro - 1 - naphthyl)amino]propyl}piperidine in a mixture of 86 ml. of concentrated hydrochloric acid and 1000 ml. of 50% aqueous ethanol. The deep reddish-brown mixture is stirred for 3 hours at —5 to 0° C. and is then made alkaline with excess aqueous sodium hydroxide solution. The solid 1-{3-{[5,6,7,8-tetrahydro - 4 - (phenylazo) - 1 - naphthyl]amino}propyl} piperidine obtained is collected by filtration, dried, and crystallized from ethanol; M.P. 114–117° C.

The acid solution salt of 1-{3-{[5,6,7,8-tetrahydro-4-(phenylazo) - 1 - naphthyl]amino}propyl}piperidine with 4,4' - methylenebis(3 - hydroxy - 2 - naphthoic acid) is prepared as follows: a solution of 4.50 g. of 4,4'-methylenebis(3-hydroxy-2-naphthoic acid)disodium salt dihydrate in 200 ml. of hot water is added to a solution of 7.53 g. of 1-{3-[5,6,7,8-tetrahydro-4-(phenylazo)-1- naphthylamino]propyl}piperidine in a mixture containing 200 ml. of water, 300 ml. of methanol and 20 ml. of 1N hydrochloric acid. The precipitated salt of 1-{3-{[5,6,7,8-tetrahydro - 4 - (phenylazo) - 1 - naphthyl]amino}propyl} piperidine with one half formula weight 4,4'-methylenebis(3-hydroxy-2-naphthoic acid) is collected by filtration, washed thoroughly with water, dried in vacuo at 60° C., and crystallized from dimethylformamide-ether; M.P. 166–168° C.

In like manner, the following related compounds can be prepared starting with 1-{3-[(5,6,7,8-tetrahydro-1-naphthyl)amino]propyl}piperidine and the appropriate aromatic amine:

1-{3-{[5,6,7,8-tetrahydro-4-(p-tolylazo)-1-naphthyl] amino}propyl}piperidine, M.P. 146–148° C.

1-{3-{[4-(p-ethylphenylazo)-5,6,7,8-tetrahydro-1-naphthyl]amino}propyl}piperidine, M.P. 158–160° C.

1-{3-{[5,6,7,8-tetrahydro-4-(m-tolylazo)-1-naphthyl] amino}propyl}piperidine.

1-{3-{[4-(p-cumenylazo)-5,6,7,8-tetrahydro-1-naphthyl] amino}propyl}piperidine, M.P. 139–141° C.

1-{3-{[5,6,7,8-tetrahydro-4-(o-tolylazo)-1-naphthyl] amino}propyl}piperidine.

The starting material, 1-{3-[(5,6,7,8-tetrahydro-1-naphthyl)amino]propyl}piperidine, can be prepared according to the following procedure, N-γ-chloropropylpiperidine hydrochloride is converted to the free base as follows: 840 g. of the hydrochloride is dissolved in 800 ml. of water, and the solution is treated with 330 ml. of cold concentrated ammonium hydroxide. The mixture is then extracted with a total of 2 liters of xylene. The xylene solution is washed, first with water until the washings are nearly neutral, then with saturated aqueous sodium chloride, and dried over anhydrous calcium sulfate. While drying, the solution is kept in an ice bath until ready for use in the next step.

A mixture of 503 g. of 5,6,7,8-tetrahydro-1-naphthylamine, 168 g. of a 50% oil dispersion of sodium hydride, and 1500 ml. of xylene is heated over a period of 30 minutes to the temperature at which a vigorous reaction, accompanied by the rapid evolution of hydrogen, occurs. After the reaction has subsided, the mixture is held at reflux temperature for 30 minutes, cooled to 50° C. and the xylene solution of N-γ-chloropropylpiperidine is added over 30 minutes with stirring. The mixture is then heated under reflux overnight.

The reaction mixture is cooled to 50° C. and 1500 ml. of water is added, cautiously at first. The layers are separated, the organic layer is washed well with water, dried over anhydrous magnesium sulfate, and concentrated under reduced pressure until most of the xylene has been removed. The residual oil is distilled under reduced pressure to give the desired intermediate as a pale yellow liquid, B.P. 159–160° C./0.1 mm., which solidifies on standing.

The salt of 1-{3-{[5,6,7,8-tetrahydro-4-(phenylazo)-1-naphthyl]amino}propyl}piperidine with two formula weights of hydrochloric acid is prepared by treating a solution of 0.5 g. of the free base in ether with a slight excess of dry hydrogen chloride, isolating the precipitated solid, and crystallizing from dimethylformamide-ethyl acetate. The salt contains one mole of water; M.P. 195–197° C.

*Example 2*

A mixture of 9.1 g. of N-(3-bromopropyl)-[5,6,7,8-tetrahydro-4-(phenylazo)-1-naphthyl]amine monohydrobromide and 50 ml. of 3-pipecoline is heated on the steam bath for 2 hours, cooled and poured into 500 g. of ice with stirring. The solid 1-{3-{[5,6,7,8-tetrahydro-4 - (phenylazo) - 1 - naphthyl]amino}propyl} - 3 - pipecoline obtained is collected by filtration, washed with water, dried, and crystallized from 2-propanol; orange crystals, M.P. 101–102° C.

Utilizing the procedures described under Examples 1 and 2 herein, the following related compounds can be prepared starting from the appropriate N-(3-bromopropyl)-5,6,7,8-tetrahydro-4-arylazo-1-naphthylamine or 1-{3-[(5,6,7,8-tetrahydro - 1 - naphthyl)amino]propyl}-3-pipecoline:

1-{3-{[4-(p-ethylphenylazo)-5,6,7,8-tetrahydro-1-naphthyl]amino}propyl}-3-pipecoline.
1-{3-{[4-(p-chlorophenylazo)-5,6,7,8-tetrahydro-1-naphthyl]amino}propyl}-3-pipecoline.
1-{3-{[4-(p-bromophenylazo):5,6,7,8-tetrahydro-1-naphthyl]amino}propyl}-3-pipecoline.
1-{3-{[5,6,7,8-tetrahydro-4-p-methoxyphenylazo)-1-naphthyl]amino}propyl}-3-pipecoline.
1-{3-{[5,6,7,8-tetrahydro-4-($\alpha,\alpha,\alpha$-trifluoro-p-tolylazo)-1-naphthyl]amino}propyl}-3-pipecoline.
1-{3-{[5,6,7,8-tetrahydro-4-(m-nitrophenylazo)-1-naphthyl]amino}propyl}-3-pipecoline.

N - (3 - bromopropyl) - 5,6,7,8 - tetrahydro - 4 -phenylazo)-1-naphthylamine monohydrobromide, employed as an intermediate in the above preparation, can be prepared as follows: 225 g. of 3-[(5,6,7,8-tetrahydro-1-naphthyl)amino]-1-propanol is dissolved in 1160 ml. of 48% hydrobromic acid, and the mixture is heated under reflux for 5 hours. Upon cooling, the solid that separates is collected by filtration, washed with 2-propanol and dried. The intermediate N - (3 - bromopropyl)-5,6,7,8-tetrahydro-1-naphthylamine hydrobromide thus obtained melts at 195–197° C. This intermediate (105 g.) is dissolved in 1400 ml. of hot ethanol, and the solution is cooled rapidly with stirring. To it is added at 0–10° C. a cold solution of benzenediazonium bromide prepared from 27.9 g. of aniline, 20.7 g. of sodium nitrite, 1200 ml. of water, and 77 ml. of 48% hydrobromic acid. The purple slurry is stirred for 3 hours at 4° C., and is then kept at 0–5° C. for 16 hours. The precipitated N-(3-bromopropyl)-5,6,7,8-tetrahydro-4-(phenylazo)-1-naphthylamine hydrobromide is collected by filtration, washed with cold water and dried at 50° C. under reduced pressure; M.P. 197–200° C.

*Example 3* p-Chloroaniline (6.4 g.) is diazotized and allowed to react with 13.6 g. of 1-{3-[(5,6,7,8-tetrahydro-1-naphthyl)amino]propyl}piperidine according to the procedure outlined under Example 1 herein. The solid 1-{3-{[4-(p - chlorophenylazo) - 5,6,7,8 - tetrahydro - 1 - naphthyl]amino}propyl}piperidine obtained is crystallized from 2-methoxyethanol-acetonitrile; shiny red plates, M.P. 156–158° C.

In like manner, the following related compounds can be prepared starting from 1-{3-[(5,6,7,8-tetrahydro-1-naphthyl)amino]propyl}piperidine and the appropriate aromatic amine:

1-{3-{[4-(o-fluorophenylazo)-5,6,7,8-tetrahydro-1-naphthyl]amino}propyl}piperidine, M.P. 128–129° C.
1-{3-{[4-(m-chlorophenylazo)-5,6,7,8-tetrahydro-1-naphthyl]amino}propyl}piperidine, M.P. 111–113° C.
1-{3-{[4-(p-bromophenylazo)-5,6,7,8-tetrahydro-1-naphthyl]amino}propyl}piperidine, M.P. 173–175° C.
1-{3-{[4-(m-fluorophenylazo)-5,6,7,8-tetrahydro-1-naphthyl]amino}propyl}-piperidine, M.P. 104–106° C.
1-{3-{[5,6,7,8-tetrahydro-4-(m-iodophenylazo)-1-naphthyl]amino}propyl}piperidine, M.P. 101–103° C.
1-{3-{[4-(o-chlorophenylazo)-5,6,7,8-tetrahydro-1-naphthyl]amino}propyl}piperidine, M.P. 137–139° C.
1-{3-{[4-(p-fluorophenylazo)-5,6,7,8-tetrahydro-1-naphthyl]amino}propyl}piperidine, M.P. 114–115° C.
1-{3-{[5,6,7,8-tetrahydro-4-(p-iodophenylazo)-1-naphthyl]amino}propyl}piperidine, M.P. 188–190° C.

The acid-addition salt of 1-{3-{[4-(p-chlorophenylazo) - 5,6,7,8-tetrahydro-1-naphthyl]amino}propyl}piperidine with one formula weight of hydrochloric acid is prepared by treating an ether solution containing 0.5 g. of the free base with a slight excess of dry hydrogen chloride, isolating the precipitated solid, and crystallizing from dimethylformamide-ethyl acetate. The salt obtained contains one-sixth mole of water; M.P. 194–196° C.

The salt of 1-{3-{[4-(p-bromophenylazo)-5,6,7,8-tetrahydro-1-naphthyl]amino}propyl}piperidine with two formula weights of hydrochloric acid is prepared in a similar manner; M.P. 194–195° C.

The salt of 1-{3-{[4-(p-chlorophenylazo)-5,6,7,8-tetrahydro-1-naphthyl]amino}propyl}piperidine with one formula weight of salicyclic acid is prepared according to the following procedure. A solution of 1.0 g. of the free base in ether is added to an ether solution of 0.58 g. of salicylic acid. After thorough mixing, the precipitated salt is isolated and crystallized from a mixture of ethyl acetate and n-heptane; M.P. 166–167° C.

*Example 4* p-Anisidine (6.2 g.) is diazotized and reacted with 13.6 g. of 1-{3-[(5,6,7,8-tetrahydro-1-naphthyl)amino]propyl}piperidine according to the procedure outlined under Example 1 herein. The solid 1-{3-{[5,6,7,8-tetrahydro-4-(p-methoxyphenylazo) - 1 - naphthyl]amino}propyl}piperidine obtained is crystallized from 2-propanol; rust colored plates, M.P. 128.5–130.5° C.

In like manner, the following related compounds can be prepared starting from 1-{3-[(5,6,7,8-tetrahydro-1-naphthyl)amino]propyl}piperidine and the appropriate aniline derivative:

1 - {3 - {[5,6,7,8 - tetrahydro - 4 - (m - methoxyphenylazo) - 1 - naphthyl]amino}propyl}piperidine, M.P. 125–126° C.
1 - {3 - {[4 - (p - ethoxyphenylazo) - 5,6,7,8 - tetrahydro-1 - naphthyl ] amino } propyl } piperidine, M.P. 129–131° C.
1 - {3 - {[5,6,7,8 - tetrahydro - 4 - (o - methoxyphenylazo) - 1 - naphthyl]amino}propyl}piperidine, M.P. 125–127° C.

The acid-addition salt of 1-{3-{[5,6,7,8-tetrahydro-4-(p - methoxyphenylazo) - 1 - naphthyl]amino}propyl}piperidine with two formula weights of hydrochloric acid is prepared by treating an ether solution containing 0.5 g. of the free base with a slight excess of dry hydrogen chloride, isolating the precipitated solid, and crystallizing from ethanol-ethyl acetate. The salt obtained contains one mole of water; M.P. 184.5–185.5° C.

The salt of 1-{3-{[5,6,7,8-tetrahydro-4-(p-methoxyphenylazo) - 1 - naphthyl]amino}propyl}piperidine with one formula weight of maleic acid is prepared according to the following procedure  A solution of 1.0 g. of the free base in 95% ethanol is mixed with a solution of 0.28 g. of maleic acid in 95% ethanol and the mixture is stirred for one hour at room temperature. After removal of the solvent under reduced pressure, the solid salt obtained is crystallized from methanol; M.P. 177–178° C.

*Example 5* m-Amino-α-methylbenzyl alcohol (6.9 g.) is diazotized and reacted with 13.6 g. of 1-{3-[(5,6,7,8-tetrahydro-1-naphthyl)amino]propyl}piperidine according to the procedure outlined under Example 1 herein. The solid α-methyl - m - {{5,6,7,8 - tetrahydro - 4 - [(3 - piperidinopropyl)amino] - 1 - naphthyl}azo}benzyl alcohol obtained is crystallized from 2-propanol; orange crystals, containing one mole of 2-propanol of crystallization; M.P. 96–101° C.

In like manner, the following compounds can be prepared starting from 1-{3-[(5,6,7,8-tetrahydro-1-naphthyl)amino]propyl}piperidine and the appropriate aniline derivative:

4' - {{5,6,7,8 - tetrahydro - 4 - [(3 - piperidinopropyl)amino] - 1 - naphthyl}azo}acetophenone, M.P. 193–194° C.

3' - {{5,6,7,8 - tetrahydro - 4 - [(3 - piperidinopropyl)amino] - 1 - naphthyl}azo}acetophenone, M.P. 140–141° C.

*Example 6*

A mixture of 13.8 g. of p-nitroaniline, 30 ml. of water and 30 ml. of concentrated hydrochloric acid is heated until solution is complete. The solution is cooled to room temperature, 80 g. of ice is added and 6.9 g. of powdered sodium nitrite is added in one portion with vigorous shaking. Shaking is continued until most of the precipitate has redissolved and the mixture is allowed to stand in an ice bath for 10 minutes. The diazonium salt solution is purified by filtration, and is poured into a cold solution of 27.2 g. of 1-{3-[(5,6,7,8-tetrahydro-1-naphthyl)amino]propyl}piperidine in 400 ml. of water and 25 ml. of concentrated hydrochloric acid while maintaining the temperature at 0–5° C. The mixture is then stirred at 0–5° C. for 3 hours, and kept at room temperature overnight. The mixture is made alkaline with sodium hydroxide solution and the solid 1-{3-{[5,6,7,8-tetrahydro-4-(p-nitrophenylazo)-1-naphthyl]amino}propyl}piperidine that precipitates is collected by filtration washed thoroughly with water, dried, and crystallized from chloroform; M.P. 208–209.5° C.

In like manner the following related compounds can be prepared, starting from 1-{3-[(5-6,7,8-tetrahydro-1-naphthyl)amino]propyl}piperidine and the appropriate aniline derivative:

1-{3-{[5,6,7,8-tetrahydro-4-(m-nitrophenylazo)-1-naphthyl]amino}propyl}piperidine, M.P. 161–162.5° C.

1-{3-{[5,6,7,8-tetrahydro-4-(o-nitrophenylazo)-1-naphthyl]amino}propyl}piperidine.

*Example 7* p-Aminobenzotrifluoride (8.06 g.) is diazotized and allowed to react with 13.6 g. of 1-{3-[(5,6,7,8-tetrahydro-1-naphthyl)amino]propyl}piperidine according to the procedure outlined under Example 1 herein. The solid 1 - {3-{[5,6,7,8-tetrahydro-4-(α,α,α-trifluoro-p-tolylazo)-1-naphthyl]amino}propyl}piperidine obtained is crystallized from ethanol; red crystals, M.P. 189–190° C.

In like manner the following related compounds can be prepared starting with 1-{3-[(5,6,7,8-tetrahydro-1-naphthyl)amino]propyl}piperidine and the appropriate aromatic amine:

1-{3-{[5,6,7,8-tetrahydro-4-(α,α,α,-trifluoro-m-tolylazo)-1-naphthyl]amino}propyl}piperidine, M.P. 107–108° C.

1-{3-{[5,6,7,8-tetrahydro-4-(α,α,α-trifluoro-o-tolylazo)-1-naphthyl]amino}propyl}piperidine.

*Example 8*

A solution of 1.0 g. of 1-{3-{[5,6,7,8-tetrahydro-4-(phenylazo) - 1 - naphthyl]amino}propyl}piperidine in ether is thoroughly mixed with a solution of 0.38 g. of salicylic acid in ether. The precipitated salt of 1-{3-{[5,6,7,8 - tetrahydro - 4 - (phenylazo)-1-naphthyl]amino}propyl}piperidine with one formula weight of salicylic acid is isolated and crystallized from dilute aqueous methanol; M.P. 134–135° C.

*Example 9*

A solution of 0.99 g. of 1,5-naphthalenedisulfonic acid disodium salt dihydrate in water is thoroughly mixed with an aqueous solution of 1.0 g. of 1-{3-{[5,6,7,8-tetrahydro - 4-(phenylazo)-1-naphthyl]amino}propyl}piperidine containing 5.3 ml. of 1 N hydrochloric acid. The precipitated salt of 1-{3-{[5,6,7,8-tetrahydro-4-(phenylazo)-1 - naphthyl]amino}propyl}piperidine with one-half formula weight of 1,5-naphthalene-disulfonic acid is isolated and crystallized from dimethylformamide. The salt containing one-third mole of water has M.P. 244–245° C.

We claim:

1. A member of the class consisting of 1-{3-{[5,6,7,8-tetrahydro - 4-(arylazo)-1-naphthyl]amino}propyl}piperidine compounds of the formula

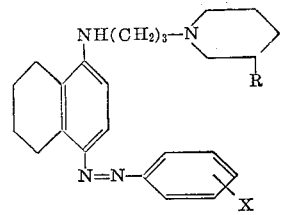

and non-toxic acid-addition salts thereof, where R is a member of the class consisting of hydrogen and methyl and X is a member of the class consisting of hydrogen, halogen, lower alkyl, hydroxyalkyl, alkoxy, acetyl, trifluoromethyl, and nitro, said lower alkyl, hydroxyalkyl, and alkoxy radicals containing from one to three carbon atoms inclusive.

2. 1 - {3 - {[5,6,7,8-tetrahydro-4-(phenylazo)-1-naphthyl]amino}propyl}piperidine.

3. 1 - {3 - {[5,6,7,8-tetrahydro-4-(phenylazo)-1-naphthyl]amino}propyl}-3-pipecoline.

4. 1 - {3-{[4-(p-chlorophenylazo)-5,6,7,8-tetrahydro-1-naphthyl]amino}propyl}piperidine.

5. 1 - {3 - {[4-(p-bromophenylazo)-5,6,7,8-tetrahydro-1-naphthyl]amino}propyl}piperidine.

6. 1 - {3 - {[5,6,7,8-tetrahydro-4-(p-methoxyphenylazo)-1-naphthyl]amino}propyl}piperidine.

References Cited by the Examiner

UNITED STATES PATENTS

| | | | |
|---|---|---|---|
| 2,226,174 | 12/1940 | McNally et al. | 260—152 |
| 2,269,218 | 1/1942 | McNally et al. | 260—152 X |
| 2,857,391 | 10/1958 | Engelhardt et al. | 260—293 |
| 2,884,455 | 4/1959 | Robertson et al. | 260—570.8 |
| 2,905,670 | 9/1959 | Kindler et al. | 260—570.8 |

CHARLES B. PARKER, *Primary Examiner.*

JOSEPH P. BRUST, *Examiner.*

F. D. HIGEL, *Assistant Examiner.*